(No Model.)

T. G. STEVENS.
APPARATUS FOR CONTROLLING SHIPS' RUDDERS.

No. 381,035. Patented Apr. 10, 1888.

Witnesses:
Allan McRae Abert
Baltus De Long

Figure 1:
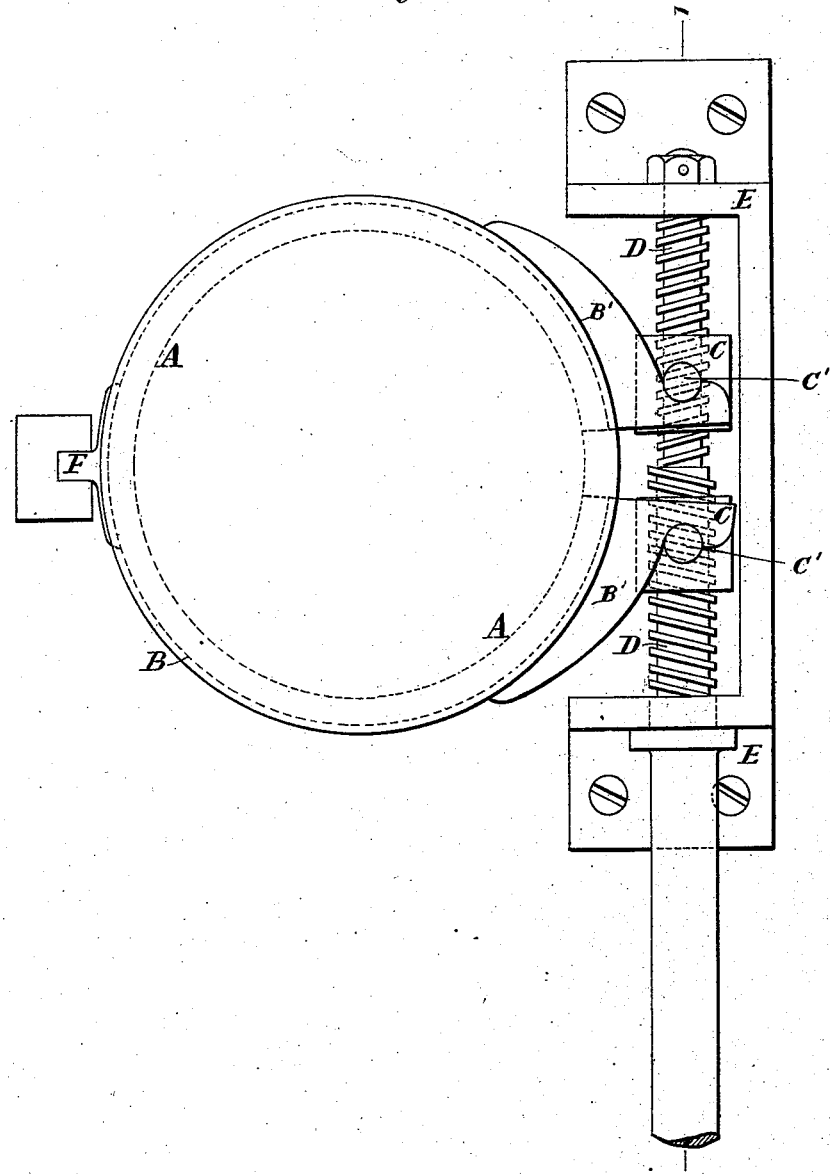

Inventor
T. G. Stevens
By atty's
Baldwin, Hopkins & Peyton (No Model.) 4 Sheets—Sheet 2.
T. G. STEVENS.
APPARATUS FOR CONTROLLING SHIPS' RUDDERS.
No. 381,035. Patented Apr. 10, 1888.
Fig. 1.ˣ
Fig. 2.ˣ
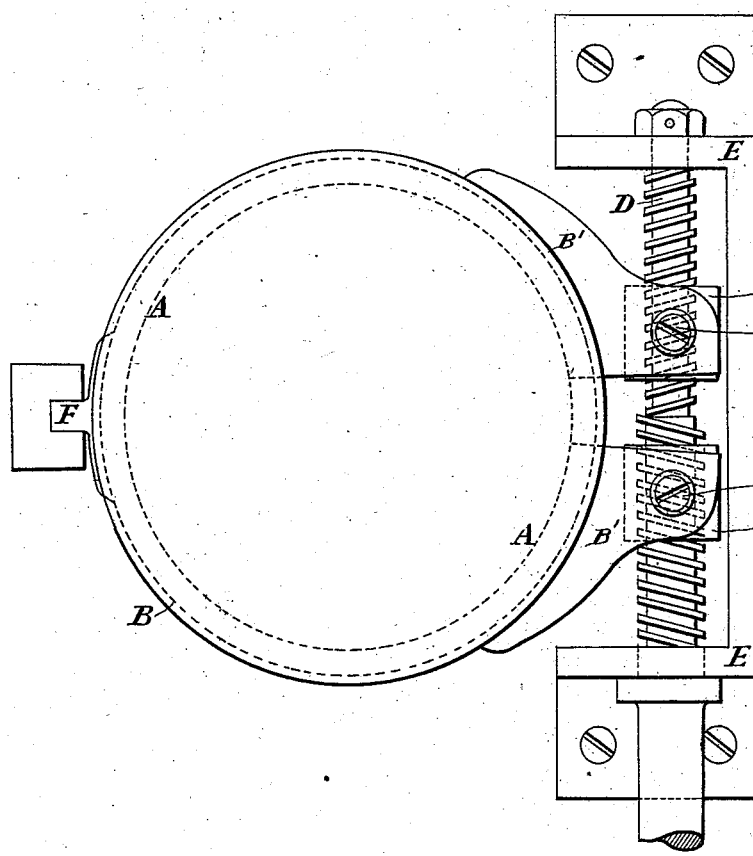
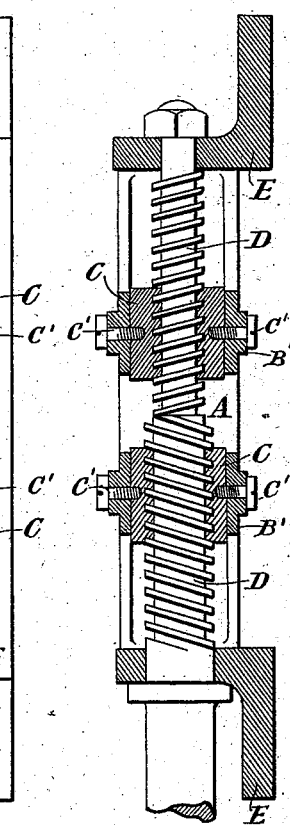
Witnesses
Allen McLane Abert
Baltus DeLong.
Inventor:
T. G. Stevens
By attys
Baldwin, Hopkins & Payton
N. PETERS, Photo-Lithographer, Washington, D. C.

(No Model.)  4 Sheets—Sheet 3.
T. G. STEVENS.
APPARATUS FOR CONTROLLING SHIPS' RUDDERS.
No. 381,035. Patented Apr. 10, 1888.
Fig. 3.
Fig. 2.
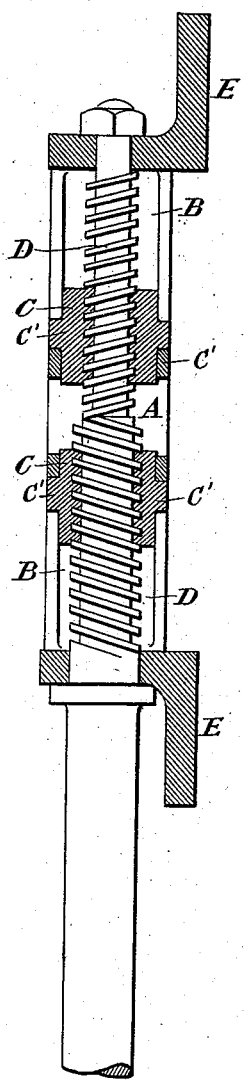
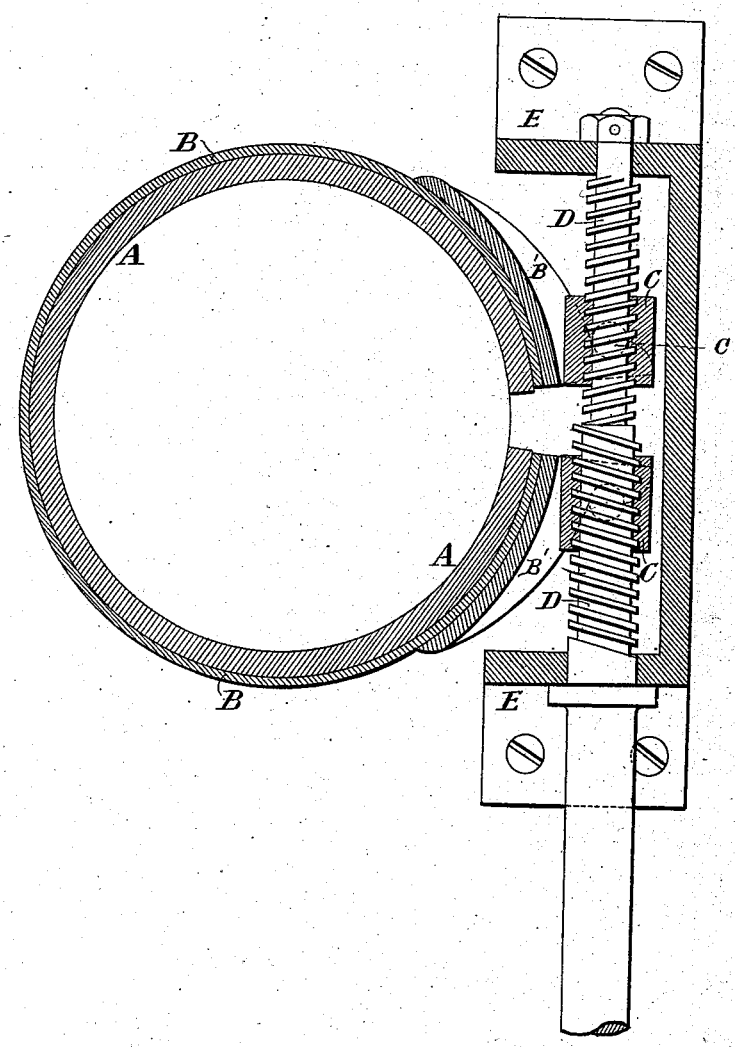
Witnesses
Inventor (No Model.)  4 Sheets—Sheet 4.

T. G. STEVENS.
APPARATUS FOR CONTROLLING SHIPS' RUDDERS.

No. 381,035.  Patented Apr. 10, 1888.

Witnesses
Allan McLane Abert
Baltus De Long.

Inventor
T. G. Stevens
By attys
Gifford, Hopkins & Naylor

UNITED STATES PATENT OFFICE.

THOMAS GEORGE STEVENS, OF RECTORY COTTAGE, SWANSCOMBE, COUNTY OF KENT, ENGLAND.

APPARATUS FOR CONTROLLING SHIPS' RUDDERS.

SPECIFICATION forming part of Letters Patent No. 381,035, dated April 10, 1888.

Application filed November 15, 1887. Serial No. 255,221. (No model.) Patented in England January 6, 1887, No. 169.

*To all whom it may concern:*

Be it known that I, THOMAS GEORGE STEVENS, a subject of the Queen of Great Britain, residing at Rectory Cottage, Swanscombe, in the county of Kent, England, engineer, have invented certain new and useful Improvements in Apparatus for Controlling Ships' Rudders, (for which I have received Letters Patent in Great Britain, No. 169, dated January 6, 1887,) of which the following is a specification.

My invention relates to means for restraining ships' rudders to any desired extent from turning away from any position into which they may have been turned. To effect this, I employ a friction-band embracing a disk or wheel on the rudder-head or on a disk or wheel geared therewith and capable of being tightened up around the disk or wheel by the turning of a spindle having a screw thread or threads cut upon it and the band being restrained from turning with the disk or wheel.

Friction-bands around a disk or wheel on the axis of a steering-wheel have before been used for locking the rudder, and such bands have been tightened up by the steersman putting his foot onto a treadle-lever; but by using a screw for tightening up the band any desired amount of friction may be applied to restrain the rudder from being turned, and this amount of friction may be maintained constantly, so that in rough weather a constant amount of friction may be applied to prevent the rudder from being jerked in either direction, so enabling the steersman readily to hold in the rudder in any position, while at the same time he is still able to shift the rudder if he requires to do so. He can also entirely lock the rudder in any position, which is often useful. To tighten the band, I use a spindle having a right and a left handed screw-thread cut upon it and screwing into screw-nuts pivoted to the ends of the band. To allow of the parts of the apparatus being readily taken apart or put together, I make one screw-thread on the spindle of larger diameter than the other screw-thread. To prevent the whole strain requisite for preventing the band from turning with the disk or wheel from coming upon the screw-spindle, I form the band with a projection upon it to enter a corresponding recess in a fixed block, or a projection in the block might be made to enter a recess in the band.

If the band be applied around a disk or wheel on the axis of the steering-wheel, I place this disk or wheel in close proximity to the steering-wheel and provide a hand-wheel on each of its ends to allow of its being turned by the steersman from whichever side of the steering-wheel he may happen to be standing.

My invention is illustrated in the drawings hereunto annexed.

Figure 5:
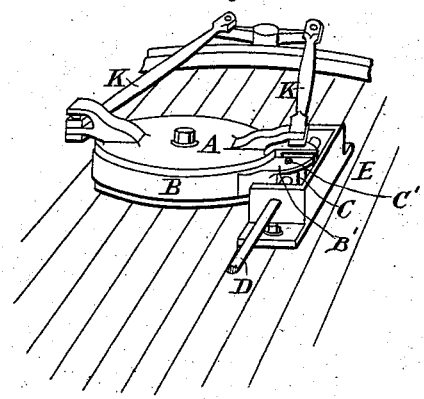
Figure 4:
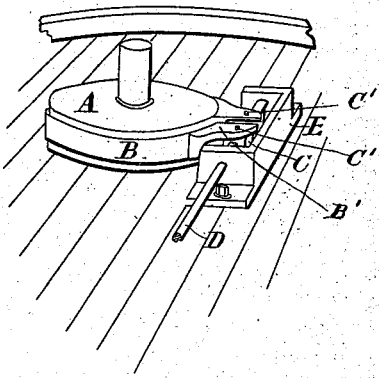
Figure 6:
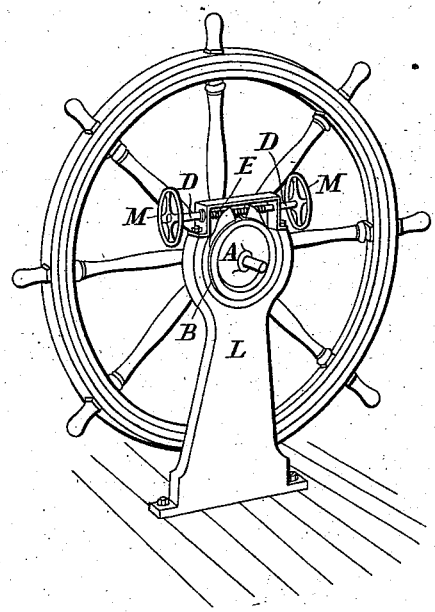

Figure 1 is an exterior plan view, and Fig. 2 a horizontal cross-section, of the friction mechanism adapted for applying friction to a disk on the rudder-head or to a disk made to turn with the rudder-head. Fig. 3 is a section taken on the line 1 1, Fig. 1. Fig. 1$^\times$ is an exterior plan view, and Fig. 2$^\times$ a vertical cross-section, of apparatus similar to that shown in Figs. 1 and 2, except in the means used for coupling the nuts to the ends of the friction-band. Fig. 4 is a perspective view of the friction mechanism applied to a disk or wheel on the rudder-head. Fig. 5 is a perspective view of the friction mechanism applied to a disk or wheel so coupled to the rudder-head that it turns with it. Fig. 6 is a perspective view of the friction mechanism applied to a disk or wheel on the axis of the steering-wheel.

In Figs. 1, 2, and 3, and 1$^\times$, 2$^\times$, A is the disk or wheel, and B the metallic band by which it is embraced. Preferably I line the band B with wood.

C C are screw-nuts. Each nut has pivots C' projecting from or inserted into its two opposite sides. Each end of the band B has secured to it a metallic block, B', formed with outwardly-projecting flanges which carry the pivots $c$ for the nuts to turn upon, as in Figs. 1$^\times$, 2$^\times$, or are formed with recesses for the pivots $c$, projecting from the nuts, to rest in, as in Figs. 1 and 2.

D is a spindle with two screw-threads cut upon it of different diameters and one right-handed and the other left-handed. One of the screw-threads screws into one nut C and the other into the other nut. The spindle is carried in bearings formed in a metallic block or frame, E.

F is a radial projection from the band B, entering a corresponding recess in a block fixed securely to the ship's deck. One or both ends of the spindle may be made to project beyond the block or frame E, and any suitable attachment may be secured to the projecting end or ends to allow of the spindle being readily turned. When the friction apparatus is applied to a disk or wheel on the rudder-head, or on a disk geared to the rudder-head, the spindle D can be prolonged to any part of the vessel at which the steering wheel or mechanism may be situated, so that the steersman may, whenever he desires, give a partial turn to the spindle, and thereby more or less restrain the rudder or set it free.

In the apparatus shown at Figs. 4 and 5, where the friction-band is applied around a disk or wheel on the rudder-head or around a disk geared to it, the block or frame E of the apparatus is so shaped as to allow of its being bolted down to the deck of the vessel.

In the apparatus shown at Fig. 6 it is so formed as to admit of its being bolted onto the top of a standard erected in close proximity to the steering-wheel, the standard being forked at its upper end and the frame E bolted to the top of the two limbs of the fork. In this figure the spindle D has a hand-wheel affixed to each of its ends, so that it may be turned by hand by the steersman on whichever side of the steering-wheel he may happen to be standing.

Although in the drawings hereunto annexed I have shown only a spindle with a right and left handed screw-thread cut upon it for tightening the friction-band around the disk or wheel, other screw mechanism might be used for the purpose—as, for example, one end of the band might be fixed and the other end coupled to a nut into which a screw-spindle is screwed, or one end of the band might be fixed and the other coupled to a lever acted upon by a screw.

By using a friction-band tightened by a screw in the manner hereinbefore described the following advantages are attained:

First. Any desired amount of friction can be applied by the steersman to the turning of the rudder, and the rudder can be controlled at any time should the steering-chains or any part of the steering-gear break down, and shifting of the steam-gear to the hand-gear can be done with safety.

Second. The rudder can be kept perfectly under control by one man in a heavy sea.

Third. Wheel-lashings are dispensed with.

Fourth. The steering is made easier and not hazardous to life or limb, as it is impossible for the wheel to overcome the steersman.

Fifth. The apparatus is quick in its action, is durable, and is not complicated or cumbersome.

Having now particularly described and ascertained the nature of my said invention and in what manner the same is to be performed, I declare that what I claim is—

1. The combination of a disk or wheel on the rudder-head or geared thereto, so as to turn with it, a friction-band embracing such disk or wheel, and screw-nuts pivoted to or bearing against projections on the ends of the band and screwing one onto a right-handed and the other onto a left-handed screw-thread cut on a spindle carried in fixed bearings.

2. The combination of a disk or wheel on the rudder-head or geared thereto, so as to turn with it, a friction-band embracing such disk or wheel, screw-nuts pivoted to or bearing against projections on the ends of the band, and a spindle carried in fixed bearings and having right and left handed screw-threads cut upon it, one screw-thread of larger diameter than the other and the screw-threads screwing into corresponding screw-nuts, substantially as described.

3. The combination of a disk or wheel on the rudder-head or geared thereto, so as to turn with it, a friction-band embracing such disk or wheel, screw-nuts pivoted to or bearing against projections on the ends of the band, a spindle with right and left handed screw-threads cut upon it screwing into such nuts, and a projection on the band entering a recess in a fixed block, or a projection on the block entering a recess in the band to prevent the band from turning, substantially as described.

THOMAS GEORGE STEVENS.

Witnesses:
JNO. H. WHITEHEAD,
  24 Southampton Buildings, London, W. C.
WALTER J. SKERTEN,
  17 Gracechurch Street, London. E. C.